(12) United States Patent
Jeon et al.

(10) Patent No.: US 10,165,396 B2
(45) Date of Patent: Dec. 25, 2018

(54) APPARATUS AND METHOD FOR ACTIVATING WIRELESS COMMUNICATION FUNCTION AUTOMATICALLY FOR GEO-FENCE, SYSTEM COMPRISING THE SAME AND NON-TRANSITORY COMPUTER READABLE STORAGE MEDIUM HAVING COMPUTER PROGRAM RECORDED THEREON

(71) Applicant: SK Planet Co., Ltd., Gyeonggi-do (KR)

(72) Inventors: Seul Ma Ro Jeon, Gyeonggi-do (KR); Eun Su Jeong, Gyeonggi-do (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 217 days.

(21) Appl. No.: 14/966,712

(22) Filed: Dec. 11, 2015

(65) Prior Publication Data

US 2016/0198295 A1  Jul. 7, 2016

(30) Foreign Application Priority Data

Jan. 5, 2015  (KR) .................. 10-2015-0000607

(51) Int. Cl.
*H04W 24/00*  (2009.01)
*H04W 4/021*  (2018.01)
(Continued)

(52) U.S. Cl.
CPC ............. *H04W 4/021* (2013.01); *H04W 4/50* (2018.02); *H04W 4/80* (2018.02)

(58) Field of Classification Search
CPC ......... H04W 4/02; H04W 8/08; H04W 60/00; H04W 64/00; H04W 48/04; G01C 21/00;
(Continued)

(56) References Cited

U.S. PATENT DOCUMENTS 3,539,924 A * 11/1970 Daskalakis ........... H04W 88/02
455/447
2013/0072226 A1  3/2013 Thramann
(Continued)

OTHER PUBLICATIONS

Office Action, State Intellectual Property Office of the People's Republic of China Patent Application No. 201510796469.5, dated Aug. 24, 2018, 6 pages. (with concise explanation of relevance).

*Primary Examiner* — Anthony S Addy
*Assistant Examiner* — Matthew W Genack
(74) *Attorney, Agent, or Firm* — Fenwick & West LLP

(57) ABSTRACT

Provided are apparatus and method for activating a wireless communication function automatically for geo-fence, a system comprising the same, and a non-transitory computer readable storage medium having a computer program recorded thereon for providing a content by activating the wireless communication function while entering a geo-fence which is a predetermined virtual area for providing the content based on a current location of a user. Thus, it is possible to greatly improve efficiency of a content providing service using a geo-fence by automatically activating a wireless communication function of user equipment according to whether a user enters the geo-fence to receive store information through communication with a beacon or a WIFI AP provided in the store positioned at the geo-fence and transmitting the corresponding store information to a geo-fence service providing device providing a content related with the store to receive the content corresponding to the store information.

6 Claims, 7 Drawing Sheets

(51) Int. Cl.
*H04W 4/50* (2018.01)
*H04W 4/80* (2018.01)

(58) Field of Classification Search
CPC ............ G01C 21/3415; G01C 21/3641; G01S 5/0009; G01S 5/0242; G01S 5/0289; G01S 5/0252; G01S 5/14; G01S 5/0027; G01S 5/0036; G01S 5/0045; G01S 5/0054; G01S 5/0063
USPC ..... 455/456.1–456.6, 457; 705/14.49, 14.53, 705/14.57, 14.58, 14.65
See application file for complete search history.

(56) References Cited

U.S. PATENT DOCUMENTS

| | | | |
|---|---|---|---|
| 2014/0257889 A1* | 9/2014 | Ashley, Jr. ............ | G06Q 10/063 705/7.11 |
| 2015/0094095 A1* | 4/2015 | Johnson ................ | H04W 4/043 455/456.3 |
| 2015/0373482 A1* | 12/2015 | Barnard ............. | H05B 37/0272 370/338 |

* cited by examiner

APPARATUS AND METHOD FOR ACTIVATING WIRELESS COMMUNICATION FUNCTION AUTOMATICALLY FOR GEO-FENCE, SYSTEM COMPRISING THE SAME AND NON-TRANSITORY COMPUTER READABLE STORAGE MEDIUM HAVING COMPUTER PROGRAM RECORDED THEREON

CROSS-REFERENCE TO RELATED APPLICATION

This application claims the benefit of Korean Application No. 10-2015-0000607 filed on Jan. 5, 2015 with the Korean Intellectual Property Office, the disclosure of which is incorporated herein by reference.

BACKGROUND OF THE INVENTION

1. Field of the Invention

The present invention relates to apparatus and method for activating a wireless communication function automatically for a geo-fence, a system comprising the same, and a non-transitory computer readable storage medium having a computer program recorded thereon, and more particularly, to apparatus and method for activating a wireless communication function automatically for a geo-fence, a system comprising the same, and a non-transitory computer readable storage medium having a computer program recorded thereon for providing a content by activating the wireless communication function while entering a geo-fence which is a predetermined virtual area for providing the content based on a current location of a user.

2. Description of the Related Art

For public relations of a current store or service, a service for setting a transmittable range of a wireless signal as a geo-fence through a beacon or a wireless hub and providing a content provided from a store including the beacon or a service provider installed with the wireless hub to user equipment which enters the corresponding geo-fence has been generalized.

Accordingly, the user equipment entering the geo-fence catches a BLE signal transmitted from the beacon or determines that the user equipment exists at a location of the geo-fence through a WIFI unique key of the wireless hub, and displays the content transmitted from the beacon or the wireless hub to provide the displayed content to the user equipment.

However, since a battery of the user equipment is continuously consumed while activating a wireless communication function of the user equipment including Bluetooth, WIFI, or the like which corresponds to a geo-fence communication scheme, generally, the user maintains the wireless communication function of the user equipment in a deactivated state.

Therefore, since contents are provided only when the wireless communication function corresponding to the geo-fence communication scheme necessarily operates, content service providers can not provide the service to the corresponding consumers and thus, there are problems in that efficiency for providing the content using the geo-fence deteriorates, efficiency of the content providing service using the geo-fence deteriorates, and the user can not receive good contents even though there are good contents.

SUMMARY OF THE INVENTION

An object of the present invention is to provide apparatus and method for activating a wireless communication function of a user equipment automatically for a geo-fence, a system comprising the same, and a non-transitory computer readable storage medium having a computer program recorded thereon for improving efficiency of a content providing service using a geo-fence by activating a wireless communication function of user equipment entering the geo-fence to provide the content corresponding to the geo-fence to the user equipment and minimizing power consumption of the user equipment by deactivating the wireless communication function of the user equipment deviating from the geo-fence.

According to an aspect of the present invention, an apparatus for activating a wireless communication function of a user equipment automatically for a geo-fence includes, a location measuring unit configured to measure a current location of the user equipment to generate location information; a geo-fence receiving unit configured to transmit the location information on the current location to a geo-fence service providing device and receive geo-fence information on one or more geo-fences existing in a predetermined radius based on the location information among a plurality of geo-fences as predetermined virtual areas on a map for providing a content from the geo-fence service providing device; a determining unit configured to measure a current location through the location measuring unit at a predetermined interval when the density of the geo-fence according to the geo-fence information is more than a predetermined reference value to determine whether to enter any one geo-fence; and an activation unit configured to determine whether to activate the wireless communication unit of the user equipment for communicating with the wireless communication device positioned in the geo-fence which the user equipment enters when entering the geo-fence to automatically activate the wireless communication unit while deactivating.

Preferably, the wireless communication unit may support at least one wireless communication scheme of Bluetooth and WIFI to perform communication.

Preferably, the determining unit may determine whether to deviate from the entered geo-fence based on the current location after entering the geo-fence.

Preferably, the activation unit may deactivate the wireless communication unit when deviating from the entered geo-fence.

Preferably, the activation unit may maintain an activated state of the wireless communication unit even when deviating from the entered geo-fence in the case where the wireless communication unit is activated before entering the geo-fence.

Preferably, the apparatus may further include a content providing unit configured to receive store information on the store through the wireless communication unit from the wireless communication device of the store positioned in the entered geo-fence to transmit the received store information to the geo-fence service providing device and receive a content corresponding to the store information from the geo-fence service providing device to provide the received content to the user.

Preferably, the wireless communication device may be a beacon or a WIFI AP.

Preferably, the determining unit may verify an arrangement direction and a separation distance from one or more adjacent geo-fences based on the current location measured through the location measuring unit when the density of the geo-fence according to the geo-fence information is less than a predetermined reference value, measure a moving direction and a moving distance based on sensing information of a sensor unit including a geomagnetic sensor and an acceleration sensor included in the user equipment, and measure the current location at the predetermined interval through the location measuring unit when a difference between the moving distance of the geo-fence positioned in an arrangement direction coinciding with the moving direction and a separation distance is less than the predetermined reference distance to determine whether to enter the geo-fence.

According to another aspect of the present invention, a method for activating a wireless communication function of a user equipment automatically for a geo-fence includes, measuring a current location of the user equipment to transmit location information on the current location to the geo-fence service providing device by means of an automatic activation device of a wireless communication function for the geo-fence included in the user equipment; receiving geo-fence information on one or more geo-fences existing in a predetermined radius based on the location information among a plurality of geo-fences as predetermined virtual areas on a map for providing a content from the geo-fence service providing device by means of the automatic activation device; comparing the density of the geo-fence according to the geo-fence information with a predetermined reference value to measure a current location at a predetermined interval when the density of the geo-fence is more than a predetermined reference value to determine whether to enter any one geo-fence by means of the automatic activation device; and determining whether to activate the wireless communication unit of the user equipment for communicating with the wireless communication device positioned in the geo-fence which the user equipment enters when entering the geo-fence to automatically activate the wireless communication unit while deactivating by means of the automatic activation device.

Preferably, the determining may further include comparing the density of the geo-fence according to the geo-fence information with a predetermined reference value to calculate a separation distance from the most adjacent geo-fence based on the current location when the density of the geo-fence is less than the predetermined reference value and measuring the current location at a predetermined interval when a difference between a moving distance measured based on a geomagnetic sensor and an acceleration sensor of the user equipment and the separation distance is less than a predetermined reference distance to determine whether to enter the geo-fence by means of the automatic activation device.

According to yet another aspect of the present invention, a computer program comprising a set of instructions, when executed, arranged to cause a computer to perform the method for activating the wireless communication function of a user device automatically for the geo-fence may be stored in a non-transitory computer readable storage medium.

According to still another aspect of the present invention, a system for activating a wireless communication function automatically for a geo-fence includes, a geo-fence service providing device configured to provide geo-fence information on one or more geo-fences existing in a predetermined radius based on a location of user equipment among a plurality of geo-fences as predetermined virtual areas on a map for providing a content; and an automatic activation device configured to measure a current location of the user equipment to transmit the location information on the current location to the geo-fence service providing device, receive geo-fence information on one or more geo-fences existing in a predetermined radius based on the location information from the geo-fence service providing device, compare the density of the geo-fence according to the geo-fence information with a predetermined reference value to measure a current location at a predetermined interval when the density of the geo-fence is more than a predetermined reference value to determine whether to enter any one geo-fence, and determine whether to activate the wireless communication unit of the user equipment for communicating with the wireless communication device positioned in the geo-fence which the user equipment enters when entering the geo-fence to automatically activate the wireless communication unit while deactivating.

As described above, according to the present invention, it is possible to greatly improve efficiency of a content providing service using a geo-fence by automatically activating a wireless communication function of user equipment according to whether a user enters the geo-fence to receive store information through communication with a beacon or a WIFI AP which is provided in the store positioned at the geo-fence and transmitting the corresponding store information to a geo-fence service providing device providing a content related with the store to receive the content corresponding to the store information.

Further, it is possible to improve battery use efficiency by controlling a location measuring frequency according to the density of the geo-fence based on the density of the geofence, automatically activating the wireless communication function only when entering the geo-fence, and automatically deactivating the wireless communication function when deviating from the geo-fence to minimize battery consumption of user equipment.

DETAILED DESCRIPTION OF THE PREFERRED EMBODIMENTS

Figure 1:
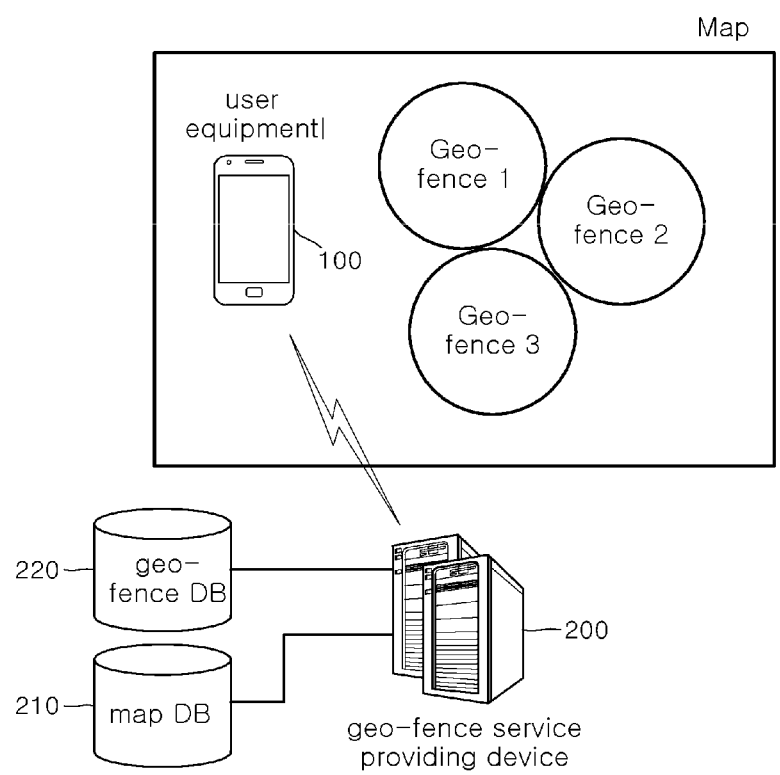
FIG. 1 is a configurational diagram of a system for activating a wireless communication function automatically for a geo-fence according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not included or additional components or steps may be further included. In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a configurational diagram of a system for activating a wireless communication function automatically for a geo-fence according to an embodiment of the present invention. As illustrated in FIG. 1, the system includes user equipment 100 including an automatic activation device having a wireless communication function for the geo-fence and a geo-fence DB 220 storing geo-fence information which sets a plurality of geo-fences as predetermined virtual areas for providing different contents onto a map according to map information stored in a map DB 210, and a geo-fence service providing device 200 for providing store-related contents to the user equipment 100 which visits the store by entering any one geo-fence.

In this case, the user equipment 100 may include various terminals such as a tablet PC including a communication function, a smart phone, a portable terminal, a mobile terminal, a personal digital assistant (PDA), a portable multimedia player (PMP) terminal, and a wearable personal station (WPS) and the geo-fence service providing device 200 may be constituted by a server.

Further, the automatic activation device having the wireless communication function for the geo-fence may be constituted by a module in the user equipment 100 and is called an automatic activation module in the following description.

In the aforementioned configuration, the geo-fence service providing device 200 stores information on contents corresponding to one or more stores positioned at the geo-fence, respectively. In addition, when the user equipment 100 communicates with the wireless communication device including a beacon or a WIFI access point (AP) installed in each store to transmit the store information on the entered store to the geo-fence service providing device 200, the geo-fence service providing device 200 may transmit and provide various contents for events related with the store visited by the user equipment 100 to the user equipment 100.

In this case, the user equipment 100 may include a wireless communication unit for communicating with the wireless communication device transmitting the store information as a wireless signal according to the BLE or the WIFI positioned in the store, and the wireless communication unit of the user equipment 100 needs to be activated so as to receive the store information from the wireless communication device positioned in the store. However, most users may not receive the content related with the store because the wireless communication unit is deactivated in order to suppress power consumption.

Accordingly, the automatic activation module according to the present invention automatically activates the wireless communication unit of the user equipment 100 only when the user equipment 100 enters the geo-fence and automatically changes the activation state into a deactivation state when the user equipment 100 deviates from the geo-fence to minimize the power consumption of the user equipment 100 and receive various contents related with the store. This will be described in detail with reference to the following drawings.

Figure 2:
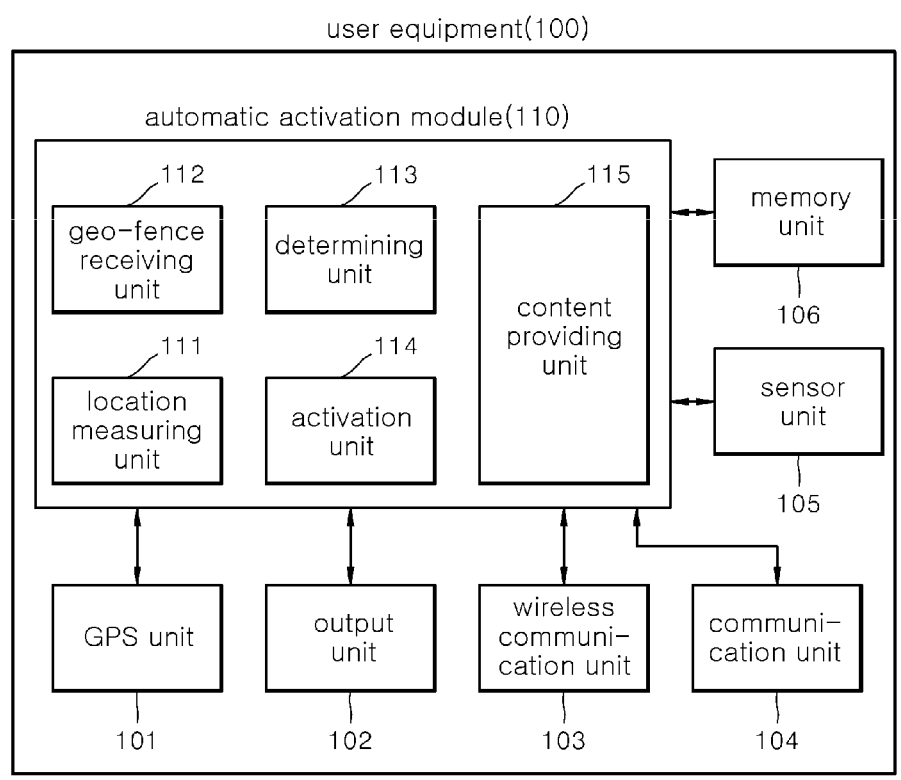
FIG. 2 is a configurational diagram of an automatic activation module constituted in user equipment according to the embodiment of the present invention.

FIG. 2 is a configurational diagram of an automatic activation module 110 constituted in user equipment 100 according to the embodiment of the present invention. As illustrated in FIG. 2, the automatic activation module 110 may include a location measuring unit 111, a geo-fence receiving unit 112, a determining unit 113, an activating unit 114, and a content providing unit 115.

Further, the user equipment 100 may include a GPS unit 101, an output unit 102, a wireless communication unit 103, a communication unit 104, a sensor unit 105, and a memory unit 106.

In this case, the communication unit 104 of the user equipment 100 may support 3G and 4G communication schemes such as CDMA-2000, WCDMA, GSM, WiMAX, and LTE, and is not limited thereto and may support various communication schemes.

Further, the wireless communication unit 103 may be constituted to support at least one communication scheme of Bluetooth and WIFI.

Meanwhile, the automatic activation module 110 may be constituted in an application form, and the user equipment 100 further includes a main processor to determine whether an application corresponding to the automatic activation module 110 which is loaded by the main processor is constituted to access the GPS unit 101, the output unit 102, the wireless communication unit 103, the communication unit 104, the sensor unit 105, and the memory unit 106 to activate the GPS unit 101, the wireless communication unit 103, and the communication unit 104.

When describing the configuration of the automatic activation module 110 based on the aforementioned configuration, first, the location measuring unit 111 may generate location information based on a current location measured by the GPS unit 101 of the user equipment 100.

Meanwhile, as described in FIG. 3A, the geo-fence receiving unit 112 transmits the location information generated by the location measuring unit 111 to the geo-fence service providing device 200 through the communication unit 104 of the user equipment 100 and receives geo-fence information on one or more geo-fences which exist within a predetermined radius based on a current location according the received location information among the plurality of geo-fences as the predetermined virtual areas on the map for providing the contents from the geo-fence service providing device 200 through the communication unit 104 to store the received geo-fence information in the memory unit 106 of the user equipment 100.

In this case, the geo-fence receiving unit 112 may transmit the location information to the geo-fence service providing device 200 through the WIFI when the WIFI function of the wireless communication unit 103 is activated.

Further, the geo-fence information may include geo-fence data including the geo-fence density according to a distribution of the geo-fence based on the current location, area information for each geo-fence, and information on a store for each geo-fence and information on a separation distance from each geo-fence based on the current data.

Accordingly, the determining unit 113 may determine whether to enter any one area of one or more geo-fences according to geo-fence information by measuring a current location through the location measuring unit 11 at a predetermined interval as illustrated in FIG. 3B when the geo-fence density according to the geo-fence information is more than a predetermined reference value.

In this case, the determining unit 113 loads map information stored in the memory unit 106 to display one or more geo-fence according to the geo-fence information on the map according to the map information output through the output unit 102 and may display the geo-fence density included in the geo-fence information, the separation distance for each geo-fence, and the store information which belongs to the geo-fence according to the geo-fence data, and the like through the output unit 102.

Meanwhile, the activation unit 114 may determine whether to activate the wireless communication unit 103 constituted in the user equipment 100 when it is determined that the user equipment 100 enters an area of geo-fence 1 included in the geo-fence information as illustrated in FIG. 3B according to a determined result of the determining unit 113 to automatically activate the wireless communication unit 103 of the user equipment 100 while deactivating.

As a result, the automatic activation module 110 may be provided to communicate with the wireless communication device provided in the store in the geo-fence through the wireless communication unit 103.

Figure 4:
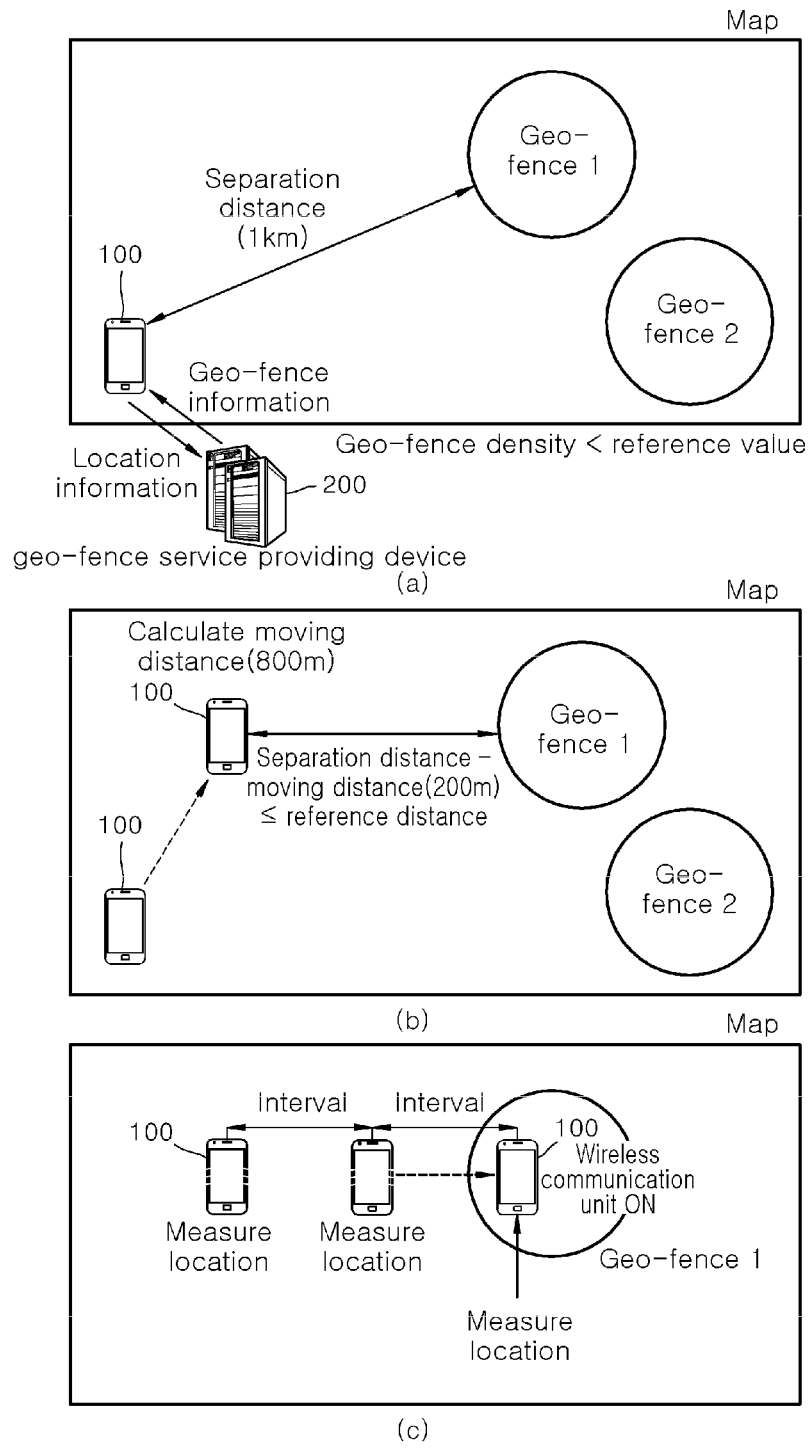
FIG. 4 is an exemplary diagram for determining whether to enter a geo-fence when the geo-fence density of the automatic activation module is less than a reference value according to the embodiment of the present invention.

Meanwhile, as illustrated in FIG. 4A, the determining unit 113 may determine one or more adjacent geo-fences (geo-fence 1 and geo-fence 2) by calculating an arrangement direction and a separation distance based on the current location for each geo-fence according to the geo-fence information based on the current location measured through the location measuring unit 111 when the geo-fence density according to the geo-fence information is less than a predetermined reference value.

In this case, the determining unit 113 may determine one or more adjacent geo-fences by verifying the arrangement direction and the separation distance for each geo-fence based on the geo-fence information.

Figure 3:
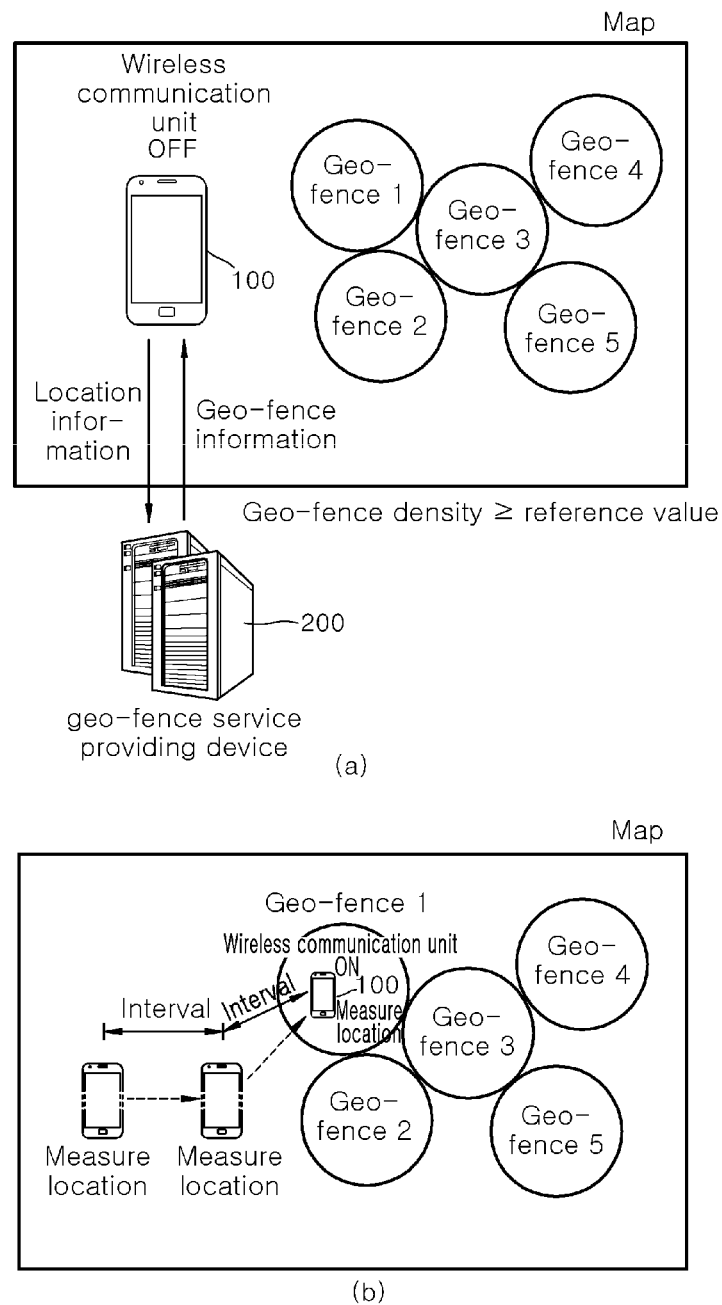
FIG. 3 is an exemplary diagram for determining whether to enter a geo-fence when the geo-fence density of the automatic activation module is more than a reference value according to the embodiment of the present invention.

Thereafter, the determining unit 113 may measure a moving direction and a moving speed based on sensing information of the sensor unit 105 including a geomagnetic sensor and an acceleration sensor to calculate a moving distance according to the moving direction as illustrated in FIG. 4B. The determining unit 113 may calculate a difference between the moving distance and the separation distance periodically or in real time with respect to the geofence (geo-fence 1) positioned in the arrangement direction coinciding with the moving direction based on the arrangement direction for each geo-fence and measures the current location of the user equipment 100 at the predetermined interval as illustrated in FIG. 3 through the location measuring unit 111 when the calculated result is less than the predetermined reference distance to determine whether to enter the most adjacent geo-fence (geo-fence 1).

Accordingly, as illustrated in FIG. 4C, the activation unit 114 may determine whether to activate the wireless communication unit 103 constituted in the user equipment 100 when it is determined that the user equipment 100 enters an area of geo-fence 1 included in the geo-fence information as illustrated in FIG. 4C according to the determined result of the determining unit 113 to automatically activate the wireless communication unit 103 of the user equipment 100 while deactivating.

In the aforementioned configuration, information on the aforementioned interval of the determining unit 113 for measuring the current location through the location measuring unit 111 and information on the aforementioned reference distance for determining whether to be adjacent to the geo-fence may be further included in the geo-fence information. As a result, the determining unit 113 may compare the reference distance according to the geo-fence information with the difference between the moving distance and the separation distance and may measure the location at an interval according to the geo-fence information.

As described above, the automatic activation module 110 activates the wireless communication unit 103 by determining whether to enter the geo-fence through a periodic location measurement when the density of the geo-fence is high based on the current location of the user to communicate with the wireless communication device positioned in the geo-fence.

Further, the automatic activation module 110 determines whether to be adjacent to the geo-fence through the sensor unit 105 when the density of the geo-fence is low to minimize battery consumption through the continuous location measurement so that the location measurement is periodically performed in the case of being adjacent to the geo-fence and efficiently determines whether to enter the geo-fence to determine whether to activate the wireless communication unit 103.

Figure 5:
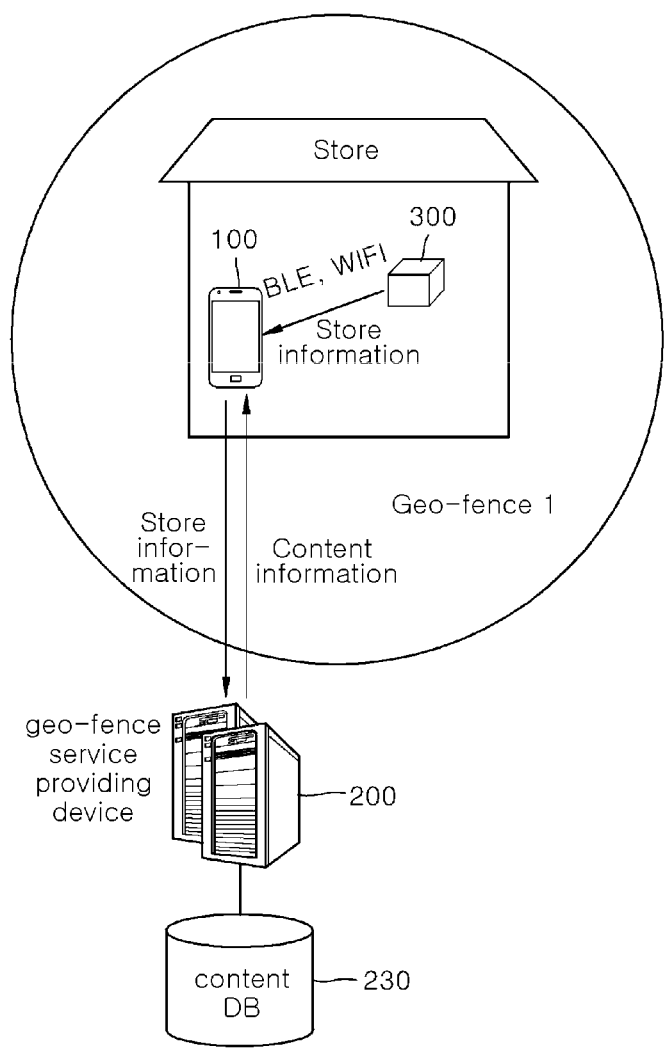
FIG. 5 is an exemplary diagram for providing store-related content information of the automatic activation module according to the embodiment of the present invention.

Meanwhile, according to the aforementioned configuration, when the wireless communication unit 103 is activated, the content providing unit 115 constituted in the automatic activation module 110 may receive store information on the corresponding store through the wireless communication unit 103 through the wireless communication device 300 provided in the corresponding store while visiting the store positioned in the area where the user equipment 100 enters the geo-fence through the wireless communication unit 103 as illustrated in FIG. 5.

In this case, the wireless communication unit 103 may support at least one communication scheme of Bluetooth and WIFI for receiving the wireless signal according the BLE or the WIFI of the wireless communication device 300 as described above.

Accordingly, the content providing unit 115 may generate store information based on the wireless signal received through the wireless communication unit 103 and provide the generated store information to the geo-fence service providing device 200 through the communication unit 104 or the wireless communication unit 103.

In this case, the geo-fence service providing device 200 may determine the store visited by the user equipment 100 based on the received store information and extract store-related content information which is matched with the store information received from the user equipment 100 in the content DB 230 in which the content matched with the store information is stored to transmit the extracted store-related content information to the user equipment 100.

Thereafter, the content providing unit 115 may receive content information through the wireless communication unit 103 or the communication unit 104 to output the content information through the output 102. As a result, the user may verify an event related with the store or use the content information in discount, exchange, and the like of related products.

As described above, the present invention has an advantage of greatly improving efficiency of the content providing service using the geo-fence by activating the wireless communication function according to whether the user enters the geo-fence to receive the store information by communicating with the beacon or the WIFI AP included in the store positioned in the geo-fence and transmitting the corresponding store information to the geo-fence service providing device 200 to receive the content corresponding to the store information from the geo-fence service providing device 200.

Further, the present invention has an advantage of improving battery use efficiency by controlling the location measuring frequency according to the density of the geo-fence and activating the wireless communication function only when entering the geo-fence to minimize the battery consumption of the user equipment 100.

Figure 6:
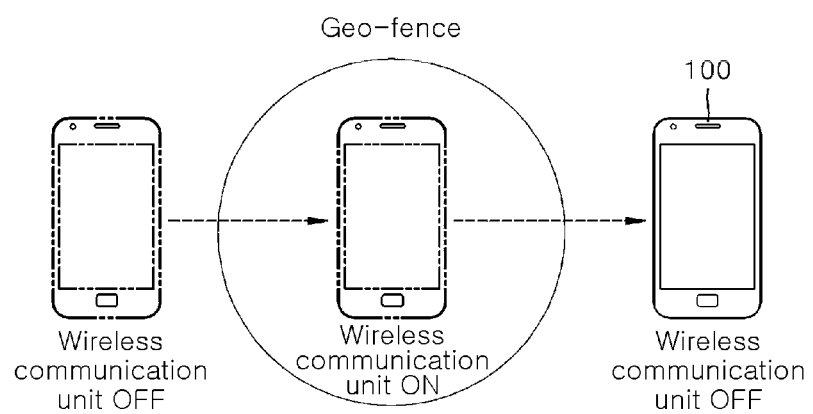
FIG. 6 is an exemplary diagram for deactivating a wireless communication unit when the automatic activation module deviates from the geo-fence according to the embodiment of the present invention.

Meanwhile, as illustrated in FIG. 6, the determining unit 113 of the automatic activation module 110 may determine whether to deviate from the entered geo-fence by periodically measuring the current location through the location measuring unit 111 after entering the geo-fence, and when the determining unit 113 determines that the user equipment deviates from the entered geo-fence according to the determined result of the determining unit 113, the activation unit 114 may deactivate the wireless communication unit 103 again.

In this case, the activation unit 114 temporarily stores state information in the memory unit 106 when the wireless communication unit 103 is already activated by the user before entering the geo-fence and needs not to be activated and may maintain the activated state by determining that the wireless communication unit 103 is activated by the user based on the state information when deviating from the geo-fence.

Figure 7:
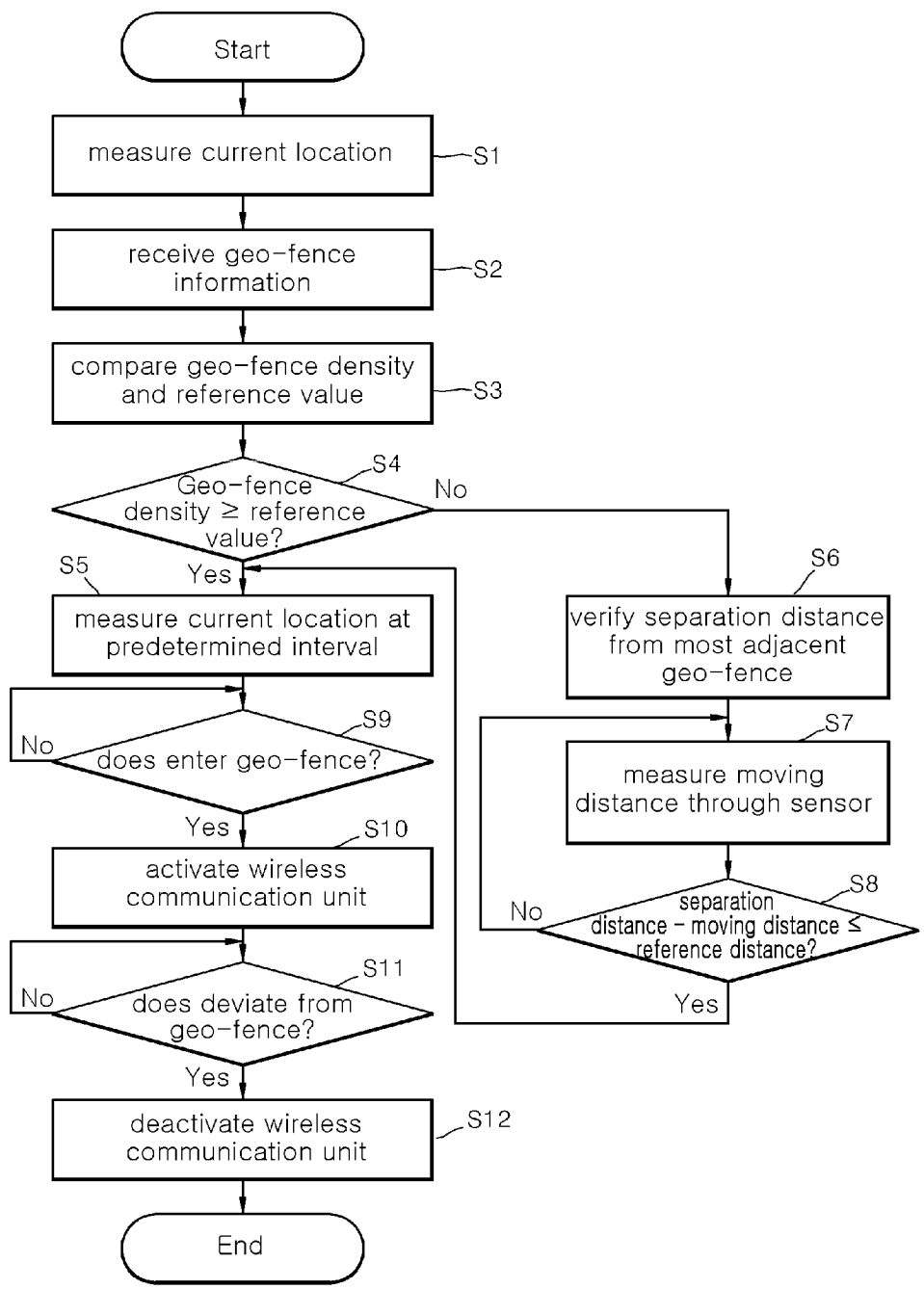
FIG. 7 is a flowchart for a method for activating a wireless communication function automatically for a geo-fence in an automatic activation module according to another embodiment of the present invention.

As described above, the present invention may further minimize the battery consumption by determining whether to deviate from the geo-fence to deactivate the automatically activated wireless communication unit 103 again. FIG. 7 is a flowchart for a method for activating a wireless communication function automatically for a geo-fence in an automatic activation module according to another embodiment of the present invention. As illustrated in FIG. 7, the automatic activation module 110 included in the user equipment 100 may measure the current position of the user equipment 100 to transmit the location information for the current location to the geo-fence service providing device 200 (S1).

Thereafter, the automatic activation module 110 may receive geo-fence information on one or more geo-fences which exist in a predetermined radius based on the location information among the plurality of geo-fences as the predetermined virtual areas on the map for providing the content from the geo-fence service providing device 200 (S2).

Next, the automatic activation module 110 compares the density of the geo-fence according to the geo-fence information with a predetermined reference value (S3), measures the current location at a predetermined interval when the density of the geo-fence is more than the reference value (S4), and determines whether to enter any one geo-fence (S5).

In this case, the automatic activation module 110 verifies a separation distance from the most adjacent geo-fence based on the current location (S6) when the density of the geo-fence according to the geo-fence information is less than the predetermined reference value (S4) and may determine whether to enter the geo-fence by measuring the location at the predetermined interval (S5) when a difference between the moving distance measured based on the geomagnetic sensor and the acceleration sensor of the user equipment 100 is less than a predetermined reference distance (S7 and S8).

Thereafter, when entering the geo-fence based on the current location (S9), the automatic activation module 110 determines whether to activate the wireless communication unit 103 of the user equipment 100 for communicating with the wireless communication device 300 positioned at a geo-fence to be entered by the user equipment 100 to automatically activate the wireless communication unit 103 while deactivating (S10).

Accordingly, the automatic activation module 110 receives the store information by communicating with the wireless communication device 300 and wireless communication unit 103 provided in the store within the geo-fence area to receive the store information and transmits the received store information to the geo-fence service providing device 200 to receive and provide the content information corresponding to the store information from the geo-fence service providing device 200.

Meanwhile, the automatic activation module 110 may deactivate the wireless communication unit 103 (S12) when the user equipment 100 deviates from the geo-fence by periodically measuring the current location after entering the geo-fence (S11).

The method for activating the wireless communication function automatically for the geo-fence according to the embodiment of the present invention may be prepared with a computer program, and codes and code segments configuring the computer program may easily deduced by a computer programmer in the art. Further, the corresponding computer program is stored in a non-transitory computer readable storage medium, and read and executed by the computer or the automatic activation module, the user equipment, the geo-fence service providing device, and the like according to the embodiment of the present invention to implement the method for activating the wireless communication function automatically for the geo-fence.

The non-transitory computer readable storage medium includes a magnetic storage medium, an optical storage medium, and a carrier wave medium. The computer program implementing the method for activating the wireless communication function automatically for the geo-fence according to the embodiment of the present invention may be stored and installed in embedded memories of the automatic activation module, the user equipment, and the geo-fence service providing device. Alternatively, external memories such as a smart card storing and installing the computer program implementing the method for activating the wireless communication function automatically for the geo-fence according to the embodiment of the present invention may be installed on the automatic activation module, the user equipment, and the geo-fence service providing device through an interface.

The present invention can be widely applied in various electronic commerce system fields, a marketing service system field, a location based service (LBS) system related field, and the like by automatically activating a wireless communication function of user equipment according to whether a user enters the geo-fence to receive store information through communication with a beacon or a WIFI AP which is provided in the store positioned at the geo-fence and transmitting the corresponding store information to a geo-fence service providing device providing a content related with the store to receive the content corresponding to the store information.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments and the following claims as well as all modified equally or equivalently to the claims are intended to fall within the scope and spirit of the invention.

What is claimed is:

1. An apparatus for activating a wireless communication function in a wireless communication unit of a user equipment automatically for a geo-fence, the apparatus comprising:
   a location measuring unit configured to measure a current location of the user equipment to generate location information;
   a geo-fence receiving unit configured to transmit the location information on the current location to a geo-fence service providing device and receive geo-fence information on one or more geo-fences existing in a predetermined radius based on the location information among a plurality of geo-fences as predetermined virtual areas on a map for providing a content from the geo-fence service providing device;
   a determining unit configured to determine whether to enter one of the existing geo-fences in said predetermined radius;
   an activation unit configured to determine whether to activate the wireless communication unit of the user equipment for communicating with a wireless communication device positioned in the geo-fence which the user equipment enters when entering the geo-fence to automatically activate the wireless communication unit while the wireless communication unit is in a deactivated state; and
   a content providing unit configured to receive store information on a store positioned in the entered geo-fence through the wireless communication unit from the wireless communication device of the store positioned in the entered geo-fence to transmit the received store information to the geo-fence service providing device and receive a content corresponding to store information from the geo-fence service providing device to provide the received content to the user,
   wherein the determining unit determines that the user equipment entered in said one of the existing geo-fences in said predetermined radius by measuring a current location through the location measuring unit at a predetermined interval when a density of the geo-fence according to the geo-fence information is more than a predetermined reference value,
   wherein the determining unit determines whether to deviate from the entered geofence based on the current location after entering the geo-fence,
   wherein the activation unit deactivates the wireless communication unit when deviating from the entered geo-fence,
   wherein the determining unit verifies an arrangement direction and a separation distance from one or more adjacent geo-fences based on the current location measured through the location measuring unit when the density of the geo-fence according to the geo-fence information is less than a predetermined reference value, measures a moving direction and a moving distance based on sensing information of a sensor unit including a geomagnetic sensor and an acceleration sensor included in the user equipment, and measures the current location at the predetermined interval through the location measuring unit when a difference between the moving distance of the geo-fence positioned in an arrangement direction coinciding with the moving direction and a separation distance is less than the predetermined reference distance to determine whether to enter the geo-fence.

2. The apparatus of claim 1, wherein the wireless communication unit supports at least one wireless communication scheme of Bluetooth and WIFI to perform communication.

3. The apparatus of claim 1, wherein the activation unit maintains an activated state of the wireless communication unit even when deviating from the entered geo-fence if the wireless communication unit is activated before entering the geo-fence.

4. The apparatus of claim 1, wherein the wireless communication device is a beacon or a WIFI AP.

5. A method for activating a wireless communication function in a wireless communication unit of a user equipment automatically for a geo-fence, the method comprising:
   measuring a current location of the user equipment to transmit location information on the current location to a geo-fence service providing device by means of an automatic activation device of a wireless communication function for the geo-fence included in the user equipment;
   receiving geo-fence information on one or more geo-fences existing in a predetermined radius based on the location information among a plurality of geo-fences as predetermined virtual areas on a map for providing a content from the geo-fence service providing device by means of the automatic activation device;
   comparing density of the geo-fence according to the geo-fence information with a predetermined reference value to measure a current location at a predetermined interval when the density of the geo-fence is more than a predetermined reference value to determine whether to enter any one geo-fence by means of the automatic activation device; and determining whether to activate the wireless communication unit of the user equipment for communicating with a wireless communication device positioned in the geo-fence which the user equipment enters when entering the geo-fence to automatically activate the wireless communication unit while the wireless communication unit is in a deactivated state and whether to deactivate the wireless communication unit when deviating from the entered geo-fence based on the current location after entering the geo-fence by means of the automatic activation device; and receiving store information on a store positioned in the entered geo-fence through the wireless communication unit from the wireless communication device of the store positioned in the entered geo-fence, transmitting the received store information to the geo-fence service providing device and receiving a content corresponding to the store information from the geo-fence service providing device to provide the received content to the user by means of the automatic activation device, wherein the determining further includes comparing the density of the geo-fence according to the geo-fence information with a predetermined reference value to calculate a separation distance from a most adjacent geo-fence based on the current location when the density of the geo-fence is less than the predetermined reference value and measuring the current location at a predetermined interval when a difference between a moving distance measured based on a geomagnetic sensor and an acceleration sensor of the user equipment and the separation distance is less than a predetermined reference distance to determine whether to enter the geo-fence by means of the automatic activation device.

6. A non-transitory computer readable storage medium storing a computer program comprising a set of instructions, when executed, arranged to cause a computer to perform operations comprising:

measuring a current location of a user equipment to transmit location information on the current location to a geo-fence service providing device by means of an automatic activation device of a wireless communication function for the geo-fence service providing device included in the user equipment;

receiving geo-fence information on one or more geo-fences existing in a predetermined radius based on the location information among a plurality of geo-fences as predetermined virtual areas on a map for providing a content from the geo-fence service providing device by means of the automatic activation device;

comparing a density of the geo-fence according to the geo-fence information with a predetermined reference value to measure a current location at a predetermined interval when the density of the geo-fence is more than a predetermined reference value to determine whether to enter any one geo-fence by means of the automatic activation device;

determining whether to activate a wireless communication unit of the user equipment for communicating with a wireless communication device positioned in the geo-fence which the user equipment enters when entering the geo-fence to automatically activate the wireless communication unit while the wireless communication unit is in a deactivated state and whether to deactivate the wireless communication unit when deviating from the entered geo-fence based on the current location after entering the geo-fence by means of the automatic activation device; and receiving store information on a store positioned in the entered geo-fence through the wireless communication unit from the wireless communication device of the store positioned in the entered geo-fence, transmitting the received store information to the geo-fence service providing device and receiving a content corresponding to the store information from the geo-fence providing device to provide the received content to the user by mean of the automatic activation device, wherein the determining further includes comparing the density of the geo-fence according to the geo-fence information with a predetermined reference value to calculate a separation distance from a most adjacent geo-fence based on the current location when the density of the geo-fence is less than the predetermined reference value and measuring the current location at a predetermined interval when a difference between a moving distance measured based on a geomagnetic sensor and an acceleration sensor of the user equipment and the separation distance is less than a predetermined reference distance to determine whether to enter the geo-fence by means of the automatic activation device.

* * * * *